(12) United States Patent
Ding et al.

(10) Patent No.: US 11,320,723 B2
(45) Date of Patent: May 3, 2022

(54) SCANNING OF OBJECTS

(71) Applicant: HEWLETT-PACKARD DEVELOPMENT COMPANY, L.P., Spring, TX (US)

(72) Inventors: Danny Ding, Taipei (TW); Frank Cheng, Taipei (TW); Thien Greg Ngoc Nguyen, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 206 days.

(21) Appl. No.: 16/479,618

(22) PCT Filed: Sep. 11, 2017

(86) PCT No.: PCT/US2017/050921
§ 371 (c)(1),
(2) Date: Jul. 22, 2019

(87) PCT Pub. No.: WO2019/050541
PCT Pub. Date: Mar. 14, 2019

(65) Prior Publication Data
US 2021/0333693 A1 Oct. 28, 2021

(51) Int. Cl.
*G03B 17/56* (2021.01)
*H04N 5/225* (2006.01)
(Continued)

(52) U.S. Cl.
CPC ............ *G03B 17/561* (2013.01); *F16C 11/06* (2013.01); *F16M 11/38* (2013.01); *H04N 5/2251* (2013.01);
(Continued)

(58) Field of Classification Search
USPC .......................................................... 396/419
See application file for complete search history.

(56) References Cited

U.S. PATENT DOCUMENTS 5,764,385 A * 6/1998 Ohyama ............ H04N 1/00737
358/498
6,345,763 B1 2/2002 Matsuda et al.
(Continued)

FOREIGN PATENT DOCUMENTS

CN 203193721 U 9/2013
CN 105791626 A 7/2016
(Continued)

OTHER PUBLICATIONS

S500p, <http://www.eloamscanner.com/officeequipment-s500p.html>, web page copyright: "© 2012-2014 by Shenzhen Eloam Technology Co., Ltd. All rights reserved".

*Primary Examiner* — Clayton E. LaBalle
*Assistant Examiner* — Warren K Fenwick
(74) *Attorney, Agent, or Firm* — HP Inc. Patent Department

(57) ABSTRACT

The present subject matter relates to scanning of objects. A device enabling scanning of objects includes an imaging unit to scan objects and a supporting unit to support the imaging unit on an electronic device. The supporting unit includes a supporting leg that forms a rotatable joint with the imaging unit to enable the imaging unit to fold over the supporting leg. The supporting unit also includes a coupling unit to detachably couple the device to the electronic device.

14 Claims, 6 Drawing Sheets

(51) Int. Cl.
  *F16C 11/06* (2006.01)
  *F16M 11/38* (2006.01)
  *H04N 13/239* (2018.01)
  *H04N 1/195* (2006.01)

(52) U.S. Cl.
  CPC ....... *H04N 1/19594* (2013.01); *H04N 13/239* (2018.05)

(56) References Cited

U.S. PATENT DOCUMENTS

| | | | |
|---|---|---|---|
| 6,421,031 | B1 | 7/2002 | Ronzani et al. |
| 7,050,106 | B2 * | 5/2006 | Nagano ................ H04N 1/195 |
| | | | 348/333.01 |
| 7,343,091 | B2 * | 3/2008 | Sukenari ................ G03B 15/03 |
| | | | 348/E5.029 |
| 7,394,978 | B2 * | 7/2008 | Sukenari ................ F16M 11/10 |
| | | | 248/187.1 |
| 7,626,634 | B2 * | 12/2009 | Ohki ...................... F16M 11/10 |
| | | | 348/207.1 |
| D612,851 | S * | 3/2010 | Maruyama ................ D14/423 |
| 8,167,441 | B2 * | 5/2012 | Ichieda ............. H04N 1/00127 |
| | | | 353/122 |
| 2004/0233325 | A1 * | 11/2004 | Lee .................... H04N 1/19594 |
| | | | 348/375 |
| 2006/0269896 | A1 | 11/2006 | Liu et al. |
| 2012/0320432 | A1 * | 12/2012 | Kimura ............. H04N 1/00814 |
| | | | 358/474 |
| 2015/0343635 | A1 * | 12/2015 | Linnell .................. B25J 9/1661 |
| | | | 700/249 |
| 2016/0077670 | A1 | 3/2016 | Short |
| 2017/0171528 | A1 | 6/2017 | Ent et al. |
| 2021/0173287 | A1 * | 6/2021 | Qian .................... G03B 17/561 |

FOREIGN PATENT DOCUMENTS

| | | |
|---|---|---|
| DE | 19648864 C2 | 5/1998 |
| TW | M352703 | 3/2009 |
| WO | WO-20060097319 A2 | 9/2006 |

* cited by examiner

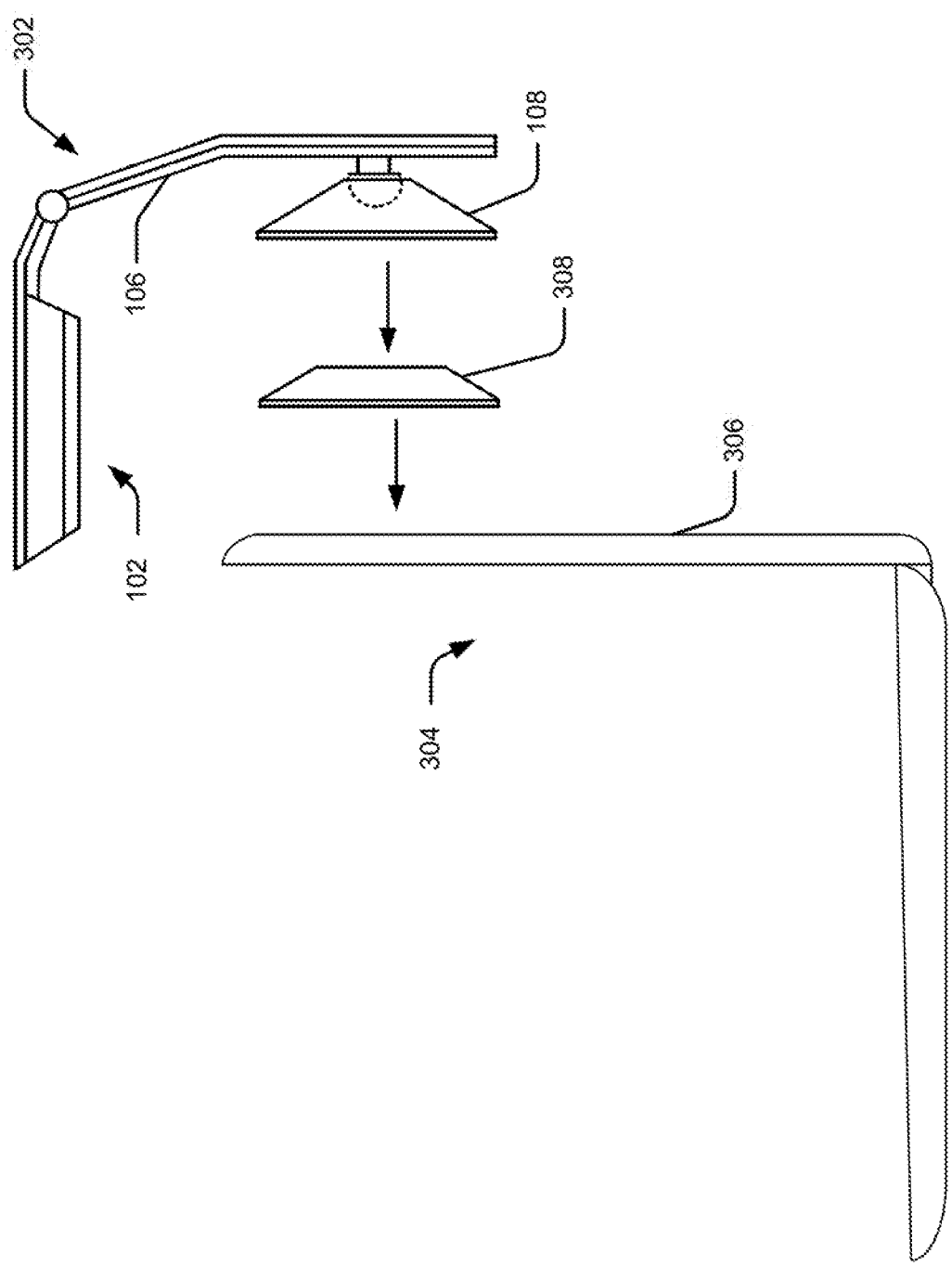

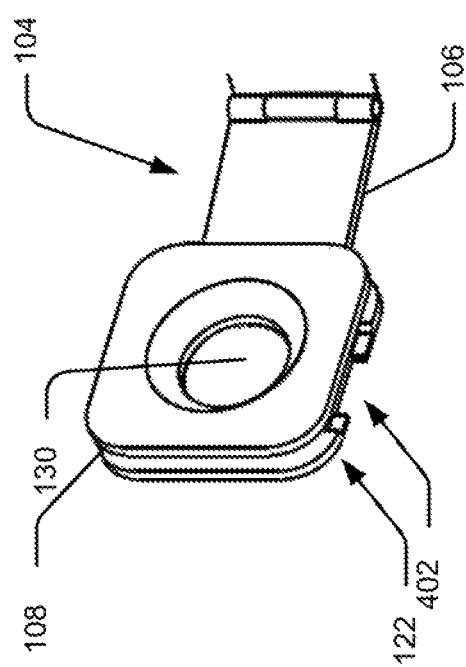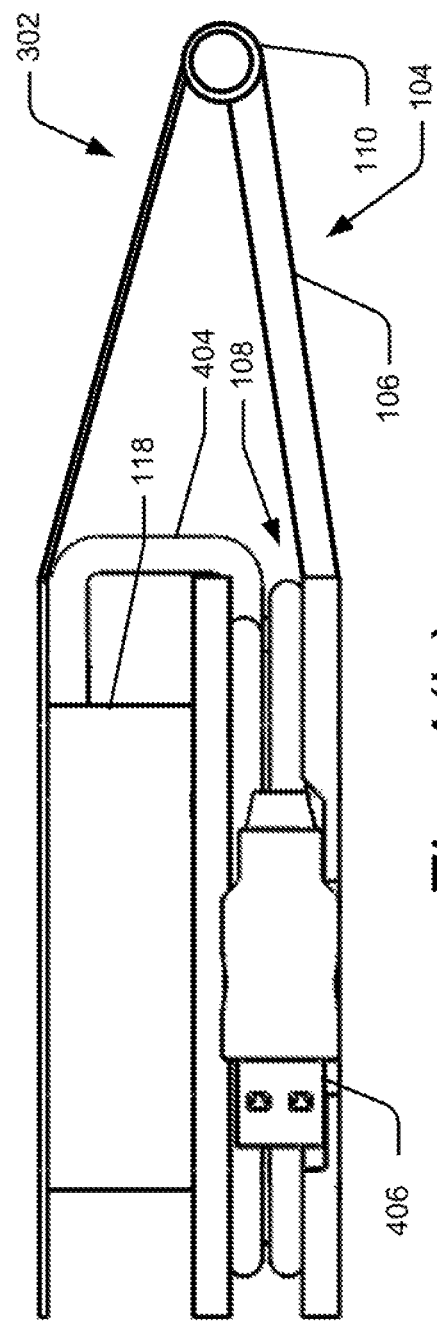
Fig. 4(a)
Fig. 4(b)

SCANNING OF OBJECTS

BACKGROUND

Imaging units can be used for scanning of objects. For example, imaging units can be used for three-dimensional (3D) scanning of objects for 3D modelling. In another example, imaging units can be used for 20 scanning of documents and pictures. An imaging unit may be mounted on an electronic device, such as a personal computer (PC) or a laptop computer, for scanning objects placed in front of the electronic device.

BRIEF DESCRIPTION OF DRAWINGS

The following detailed description references the figures, wherein:

FIG. 2(*b*) illustrates a ball and socket joint, according to an example implementation of the present subject matter.

FIG. 3 illustrates mounting of a device for scanning of objects on an electronic device, according to an example implementation of the present subject matter.

FIG. 4(*a*) illustrates a supporting unit of a device for scanning of objects, according to an example implementation of the present subject matter.

FIG. 4(*b*) illustrates a device for scanning of objects in a folded position, according to an example implementation of the present subject matter.

DETAILED DESCRIPTION

Figure 1A:
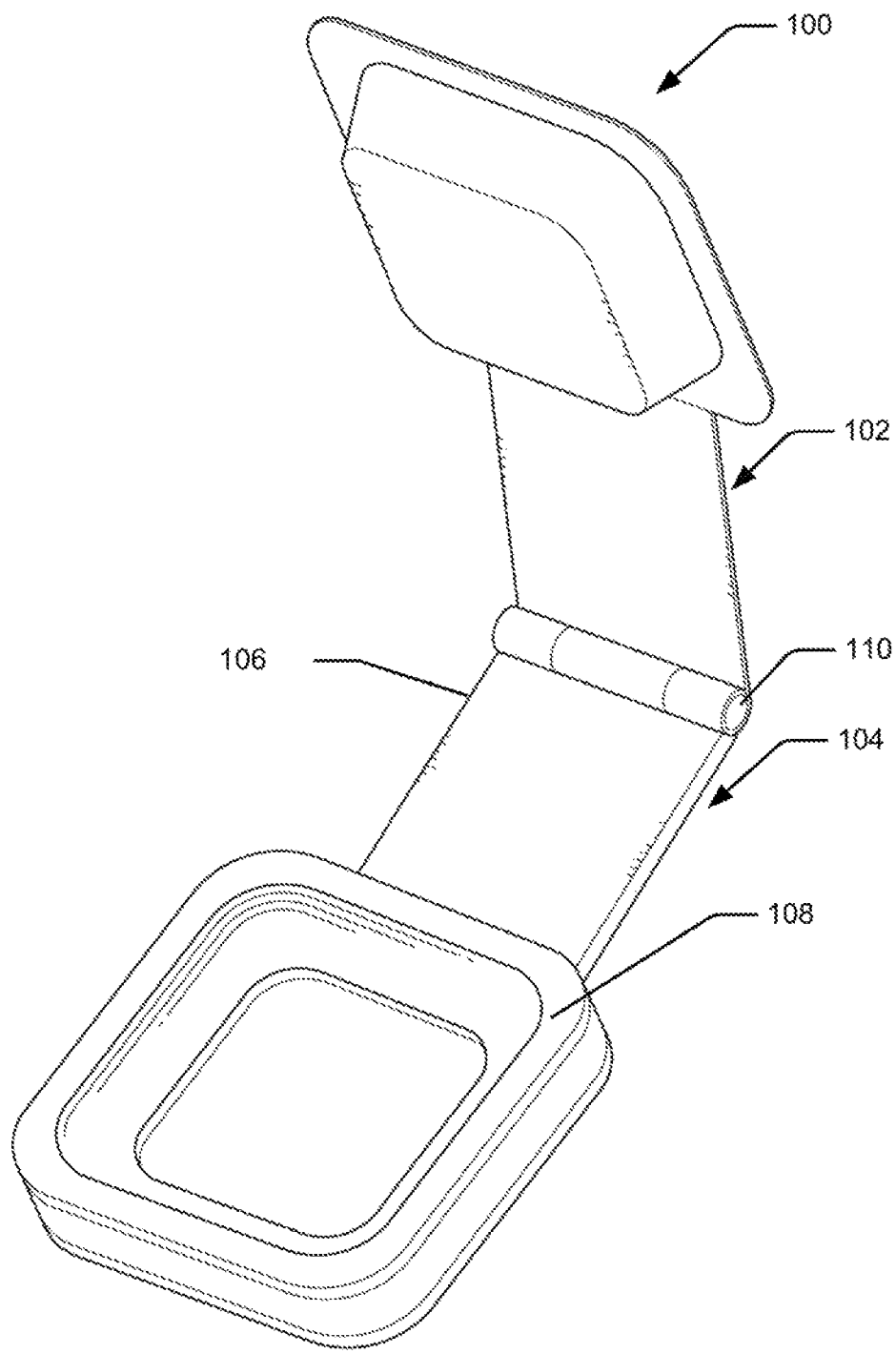
FIG. 1(*a*) illustrates a device for scanning of objects, according to an example implementation of the present subject matter, FIG. 1(*b*) illustrates a device for scanning of objects, according to an example implementation of the present subject matter.

Imaging units include cameras for scanning objects. An imaging unit may be mounted on an electronic device, such as a personal computer (PC) or laptop computer, for scanning objects placed in front of the electronic device. The imaging unit may be mounted on the electronic device using a mounting system.

Generally, the mounting systems used for mounting imaging units on electronic devices do not provide for portability of the imaging units. For example, the imaging unit may be fixedly connected to the electronic device, resulting in an inability to detach the imaging unit from the electronic device. Further, in some cases, the imaging units may not be easily maneuvered when mounted on the electronic devices. For instance, the imaging units cannot be adjusted to different orientations to scan the objects from different angles.

The present subject matter relates to articles for scanning of objects. With the implementations of the present subject matter, imaging units can be adjusted to different orientations during use and can be transported for use with different electronic devices.

In accordance with an example implementation, a device includes an imaging unit to scan objects and a supporting unit to support the imaging unit on an electronic device. The supporting unit includes a supporting leg forming a rotatable joint, such as a hinge joint, with the imaging unit to enable the imaging unit to fold over the supporting leg. The supporting unit also includes a coupling unit to detachably couple the device to the electronic device. In an example, the coupling unit includes a magnet that is to be detachably attached to a plate on the electronic device.

The coupling unit may include a depression. When the imaging unit is folded over the supporting leg, a portion of the imaging unit can be accommodated in the depression, thereby reducing the dimensions of the device when it is folded.

The present subject matter provides portable and maneuverable devices for use with electronic devices for scanning of objects. Since the device includes a rotatable joint between the supporting leg and the imaging unit, the imaging unit can be folded over the supporting leg. This enables the folding of the device into a compact structure. Further, the rotatable joint enables rotating the imaging unit about the supporting leg when in use. This enables scanning objects from several heights and angles when the device is mounted on the electronic device. Further, since the device is to be detachably coupled to the electronic device, the device can be detached from the electronic device when not in use or when it is to be ported for use with another electronic device.

The following description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Example implementations of the present subject matter are described with regard to devices for supporting imaging units on personal computers (PCs) and laptop computers. Although not described, it will be understood that the implementations of the present subject matter can be used with other types of electronic devices as well, such as television, tablet, smartphone device, and the like.

Figure 1B:
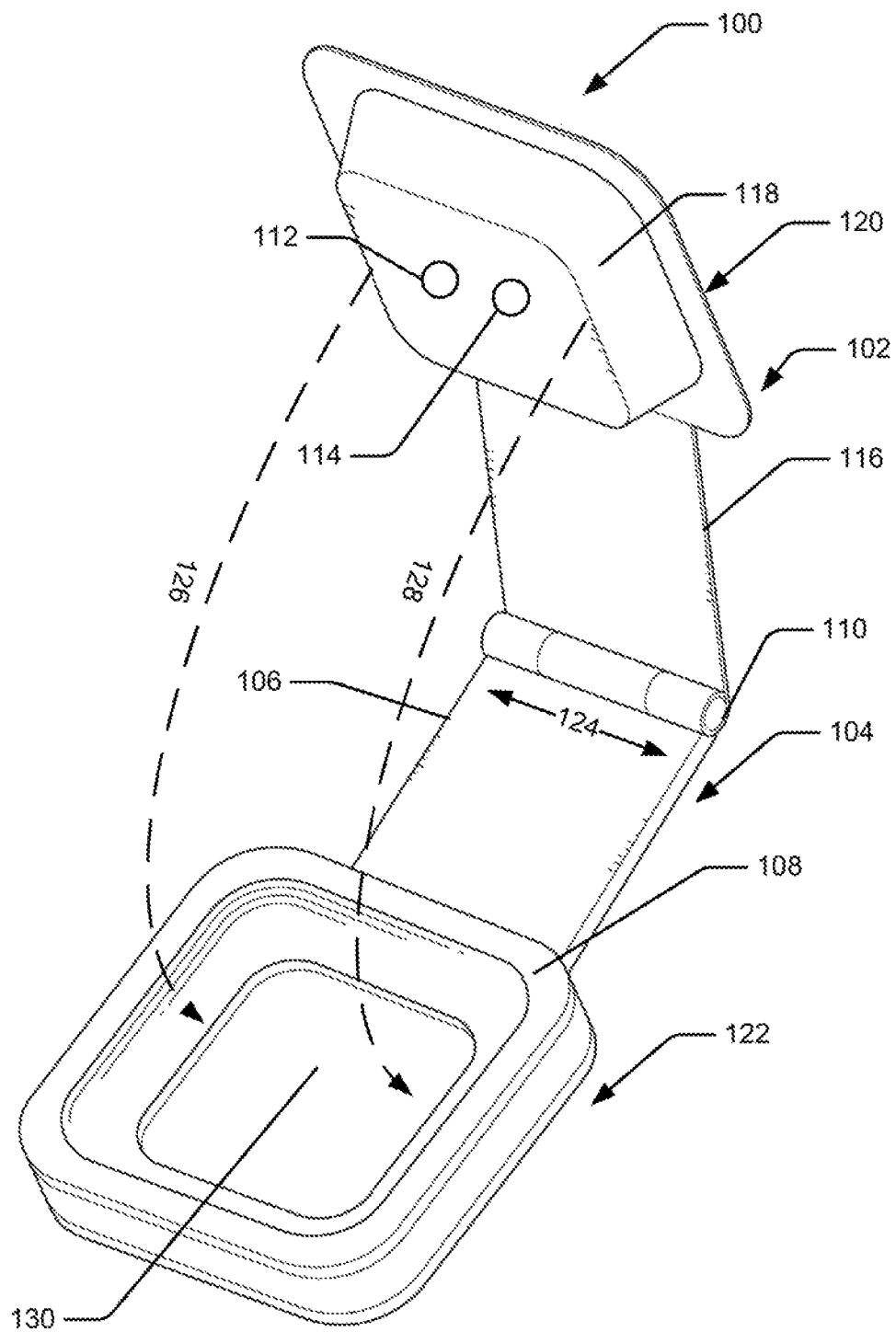

FIG. 1(*a*) illustrates a device 100, according to an example implementation of the present subject matter. The device 100 may also be, referred to as a camera assembly 100.

The device 100 can be mounted on an electronic device (not shown in FIG. 1(*a*)) to perform scanning of objects. Here, the term scanning refers to operations including, but not restricted to, 3D scanning, document photography, and desktop photography. In addition to scanning of objects, the device 100 can be used for other functions, such as gesture detection and videoconferencing, as well.

The device 100 includes an imaging unit 102 and a supporting unit 104. The imaging unit 102 can include a camera (not shown in FIG. 1(*a*)) for scanning of objects. The supporting unit 104 supports the imaging unit 102 on an electronic device, such as a PC or a laptop computer. The supporting unit 104 includes a supporting leg 106 and a coupling unit 108.

The supporting leg 106 is connected to the imaging unit 102 by a rotatable joint 110 such that the imaging unit 102 can be rotated about the rotatable joint 110. The rotatable joint 110 can be, for example, a hinge joint, and may be interchangeably referred to as a hinge joint 110. Although explained with reference to a hinge joint herein, the rotatable joint 110 may be any joint that enables rotation of the imaging unit 102 about the rotatable joint 110 and enables folding of the imaging unit 102 over the supporting leg 106.

The rotation of the imaging unit 102 about the hinge joint 110 enables folding of the imaging unit 102 over the supporting leg 106. The supporting leg 106 may be implemented as a longitudinally extending plate with one end of the supporting leg 106 connected to the hinge joint 110 and another end connected to the coupling unit 108. The coupling unit 108 enables detachable coupling of the device 100 to an electronic device (not shown in FIG. 1(*a*)).

In an example, to form the detachable coupling, the coupling unit 108 includes a magnet (not shown in FIG. 1). The magnet can attach to a plate attached to the electronic device to form a magnetic coupling between the coupling unit 108 and the plate. The magnetic coupling thus formed allows the device to be detachably coupled to the electronic device. In other examples, other ways of forming detachable coupling may be used. The device 100 will be explained in greater detail with reference to FIG. 1(*b*).

FIG. 1(*b*) illustrates the device 100, according to an example implementation of the present subject matter. The imaging unit 102 includes cameras, such as cameras 112 and 114. While two cameras have been shown as an example, there may be one camera in an implementation. In other implementations, more than two cameras may be present. In an example, the cameras 112 and 114 include at least one of a two-dimensional (2D) camera and a three-dimensional (3D) camera. The 2D camera can be, for example, a 14 mega-pixel camera. Further, the 3D camera can include a laser projector and laser CMOS (Complementary metal-oxide-semiconductor) for depth measurement. While not shown in the figure, it will be understood that in addition to the cameras 112 and 114, the imaging unit 102 can include accessories, such as one or more Light Emitting Diodes (LEDs) for 2D/3D camera flash and streaming activity indication, and the like. In an example, the imaging unit 102 may include six flash LEDs and one activity LED. The arrangement of the cameras 112 and 114 shown in FIG. 1(*b*) is merely an example arrangement, and the cameras 112 and 114 and the accessories may be arranged in any manner.

The imaging unit 102 includes a head portion 118, which includes the cameras 112 and 114, and a leg portion 116. The leg portion 116 is connected to the hinge joint 110 at one end and to the head portion 118 at the other end. In an implementation, the leg portion 116 includes a first base portion 120 away from the hinge joint 110 for accommodating the head portion 118. In an example, the first base portion 120 may have a larger width than the remainder of the leg portion 116 to be able to accommodate the head portion 118. In other examples, the first base portion 120 may be differently sized depending on the size of the head portion 118.

Similar to the leg portion 116, the supporting leg 106 can have a second base portion 122 away from the hinge joint 110. The coupling unit 108 may be coupled to the second base portion 122 of the supporting leg 106. The coupling between the supporting leg 106 and the coupling unit 108 is explained later with reference to FIGS. 2(*a*) and 2(*b*).

The presence of the rotatable joint, such as the hinge joint 110, between the supporting leg 106 and the imaging unit 102 allows the imaging unit 102 to be rotated and folded over the supporting leg 106. For this, in an implementation, the hinge joint 110 is provided along the width of the supporting leg 106 and the imaging unit 102, i.e., in the direction of the arrow 124. Hence, as illustrated in FIG. 1(*b*), the rotation of the imaging unit 102 towards the supporting leg 106 in the direction indicated by the arrows 126 and 128 enables folding of the device 100 into a collapsed state.

In an example, the imaging unit 102 may be rotated till the imaging unit 102 comes into contact with the coupling unit 108 so that the device 100 can be folded into a compact structure. For folding the device 100, the imaging unit 102 may be rotated such that the cameras 112 and 114 of the imaging unit 102 remain unexposed in the folded position of the device 100. For this, in an implementation, the imaging unit 102 can be rotated in the direction indicated by the arrows 128 and 128.

The length spanned by the device 100 when it is in the folded position is about half its length in a fully open position, i.e., where the coupling unit 108 and the head portion 118 are at a maximum possible distance apart from each other. Therefore, the device 100 can be folded into a highly compact structure, thereby increasing its portability. For use, the device 100 can be opened from the folded position by rotating the imaging unit 102 in a direction opposite to that indicated by the arrows 126 and 128.

When the device 100 is folded, a portion of the imaging unit 102 comes into contact with the coupling unit 108. In an example, this portion is at least a part of the head portion 118. In order to accommodate the part of the head portion 118 when the device 100 is folded, the coupling unit 108 can include a depression 130. As used herein, depression refers to a sunken region or a cavity in the surface of the coupling unit 108. The depression 130 may have a suitable size and shape depending on the shape and size of the head portion 118 of the imaging unit 102 for accommodating the head portion 118 in the depression 130. For example, if the head portion 118 is trapezoidal in shape, the depression 130 may have a rectangular shape, as illustrated in FIG. 1(*b*). In another example, if the head portion 118 is cylindrical in shape, the depression 130 may have a circular shape. As will be understood, the shape and size of the head portion 118 and the depression 130 illustrated in FIG. 1(*b*) is an example, and the head portion 118 and the depression 130 may have other shapes and sizes.

The accommodation of at least a part of the head portion 118 of the imaging unit 102 in the depression 130 enables reduction of the thickness of the device 100 when it is in the folded position. This further simplifies packaging and transportation of the device 100. In an example, the accommodation of the head portion 118 of the imaging unit 102 in the depression 130 reduces the thickness of the device 100 by about 70% as compared to its thickness in the folded position in the absence of the depression 130.

Figure 2A:
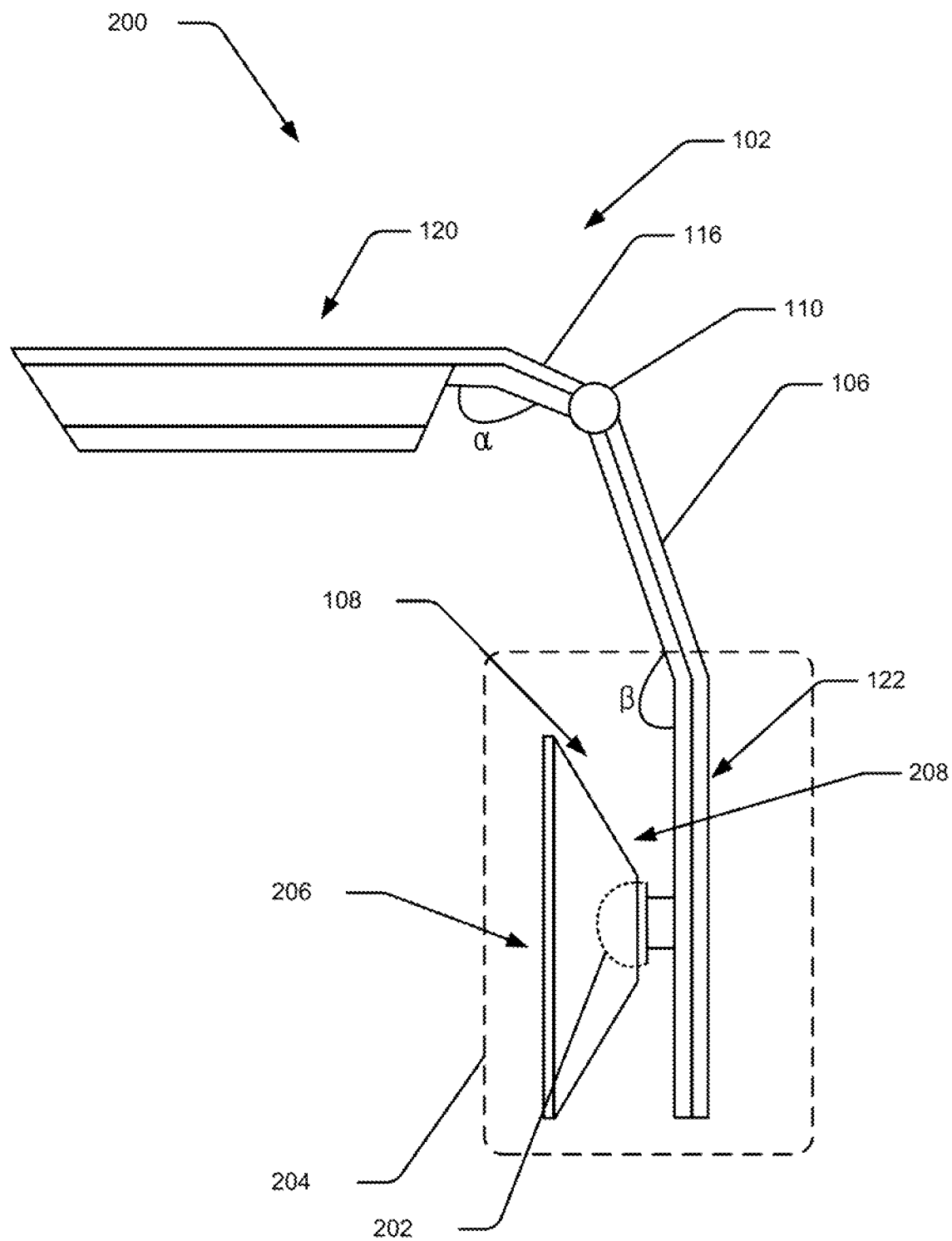
FIG. 2(*a*) illustrates a device for scanning of objects, according to another example implementation of the present subject matter.
Figure 2B:
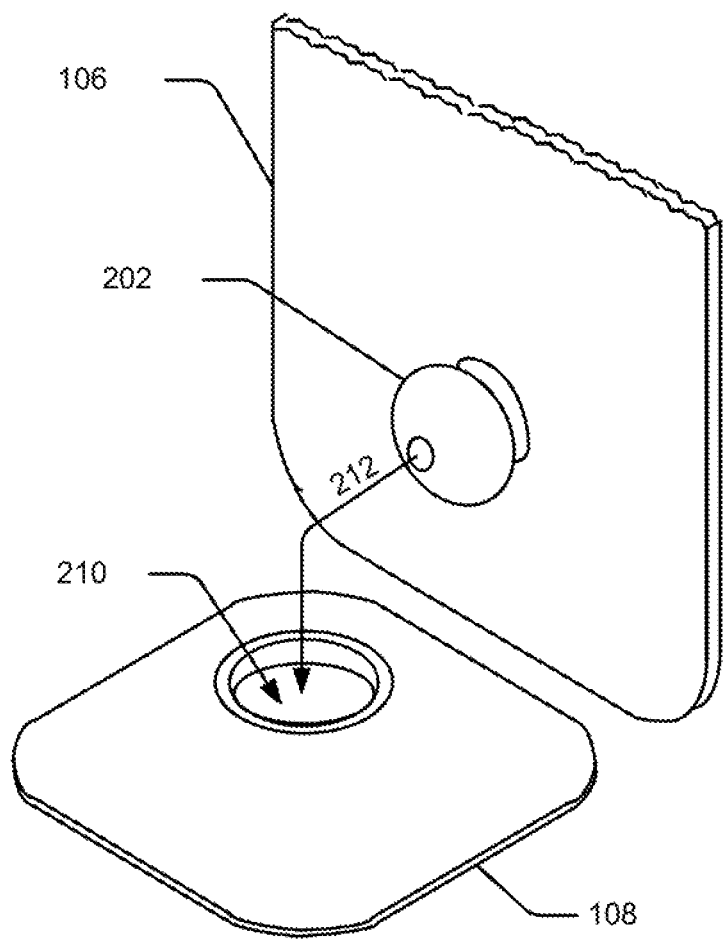

FIG. 2(*a*) illustrates a device 200, according to an example implementation of the present subject matter. The device 200 may be an example implementation of the device 100. Therefore, the components of the device 200 that are similar to the ones in the device 100 are represented by the same reference numerals.

The device 200 includes the imaging unit 102 and the supporting leg 106, which are coupled to each other through the hinge joint 110. As explained earlier, the hinge joint 110 facilitates the imaging unit 102 to rotate and fold over or away from the supporting leg 106. Further, the supporting leg 106 is rotatably coupled to the coupling unit 108.

In an implementation, the device 200 includes a ball 202 attached to the supporting leg 106. In an example, the ball 202 is attached to the supporting leg 106 through a groove present in the supporting leg. In an example, the ball 202 may be attached to the second base portion 122 of the supporting leg 106. The ball 202 is to fit into a socket on the coupling unit 108, which, in turn, may be coupled to the electronic device. Such an arrangement forms a ball and socket joint between the supporting leg 106 and the coupling unit 108 and allows the supporting leg 106 to be rotated about the coupling unit 108.

The coupling unit 108 includes a face 206 that can be coupled to the electronic device and a rear side 208 having the socket. In an implementation, the face 206 of the coupling unit 108 is detachably attached to a plate on the electronic device. In another implementation, the coupling unit 108 is directly attached to the electronic device. In an example, when the coupling unit 108 is detachably attached to the plate on the electronic device, the face 206 may include a magnet that is to be coupled to the plate. In another example, when the coupling unit 108 is directly attached to the electronic device, the coupling unit 108 may be glued to the electronic device.

In an implementation, when the coupling unit 108 is detachably attached to the plate on the electronic device, the device 200 may be detached from the electronic device by pulling the device 200 away from the electronic device for overcoming the magnetic force of attraction between the coupling unit 108 and the magnetic plate. On the other hand, when the coupling unit 108 is directly attached to the electronic device, the remainder of the device 200, which includes the supporting leg 106 and the imaging unit 102, can be detached from the electronic device by decoupling the ball and socket joint.

In an implementation, to allow the device to be folded and to accommodate a part of the head portion 118 in the coupling unit 108, the first base portion 120 of the leg portion 116 may be provided at an angle α that is lesser than 180° relative to the remainder of the leg portion 116. Similarly, the second base portion 122 of the supporting leg 106 may be provided at an angle β that is lesser than 180° relative to the remainder of the supporting leg 106. Such an arrangement enables accommodating the head portion 118 of the imaging unit 102 in the depression 130 of the coupling unit 108, FIG. 2(*b*) illustrates an exploded view of the components present in the dotted rectangle 204, according to an example implementation of the present subject matter.

As illustrated, the ball 202 is attached to the supporting leg 106, for example, by inserting the ball 202 into a groove in the supporting leg 106. Further, the coupling unit 108 includes a socket 210 on its rear side 208 into which the ball 202 can fit. The ball 202 can be inserted into the socket 210, as indicated by the arrow 212. This forms the ball and socket joint between the coupling unit 108 and the supporting leg 106.

Since the ball and socket joint provides a rotatable coupling between the supporting leg 106 and the coupling unit 108, the supporting leg 106 can be rotated in any direction about the axis of the ball and socket joint, for example, from one side edge of the electronic device to the opposite side edge of the electronic device. Therefore, when the device 200 is mounted on the electronic device, the device 200 can be rotated to be positioned in various directions depending on the angle from which an object is to be scanned. Further, since the imaging unit 102 can be rotated about the hinge joint 110 as well, further adjustment of the scanning angle can be performed. Therefore, presence of the ball and socket joint and the hinge joint 110 enable rotation of the imaging unit 102 about two axes (about the axis of the hinge joint 110 and about an axis of the ball and socket joint). This enables positioning the cameras at several heights and angles relative to the objects to be scanned. Further, a wide field of view for scanning objects can be achieved. In an example, for a 2D document/picture scanning, by suitable adjustment of the imaging unit 102 using the hinge joint 110 and the ball and socket joint, the head portion 118 can be arranged parallel to a plane containing the document/picture, such as a ground plane, thereby minimizing perspective distortion, FIG. 3 illustrates connection of a device 302 on an electronic device 304, according to an example implementation of the present subject matter. The device 302 can be any one of the devices 100 and 200. Although the electronic device 304 is shown to be a laptop computer, the electronic device 304 can be any other type electronic device as well, such as a Personal Computer (PC) monitor and the like.

The device 302 may be attached to a rear side of the display 306 of the electronic device 304. In an example, to enable attaching the device 302 on the electronic device 304, a plate 308 may be attached to the electronic device 304. The plate 303 may include a magnetic material, such as a ferromagnetic material, for example, iron and nickel. Such a plate may be referred to as a magnetic plate 308.

In an example, one side of the magnetic plate 308 may be attached to the electronic device 304, for example, by gluing. The other side of the magnetic plate 308 can be magnetically coupled to the face 206 of the coupling unit 108 that has a magnet.

The magnetic plate 308 can be positioned anywhere on the rear side of the display 306. In one example, the magnetic plate 308 is positioned such that when, the device 302 is coupled to the magnetic plate 308, the imaging unit 102 lies above the top of the display 306, thereby enabling scanning of objects in front of the electronic device 304.

In an implementation, when the imaging unit 102 is not in use, the device 302 can be removed from the magnetic plate 308 as explained above and folded about the hinge joint 110. Thereafter, the device 302 can be stored or ported to any other location, such as to another electronic device on which object scanning is to be performed. To enable attaching the device 302 to different electronic devices, each electronic device may be provided with a magnetic plate like the magnetic plate 308. Thus, the use of the detachable magnetic coupling provides flexibility in the use of the device 302 with different electronic devices.

In an implementation, for using the imaging unit 102, the cameras 112 and 114 can be operationally connected to the electronic device 304 through cables. The cables may be, for example, Universal Serial Bus (USB) cables, which can be connected to a USB port in the electronic device 304. For ease of transport and storage, the cables may be accommodated in the device 302 when the device 302 is in a folded position, as will be explained with reference to FIGS. 4(*a*) and 4(*b*).

FIG. 4(*a*) illustrates the supporting unit 104 of the device 302 with provision for accommodating a cable, according to an example implementation of the present subject matter. As explained earlier, the supporting unit 104 includes the coupling unit 108 and the supporting leg 106. The second base portion 122 of the supporting leg 106 lies beneath the coupling unit 108. The second base portion 122 may include a cleft 402 on one side. The cleft 402 can include a step on both ends and a gap between the steps to accommodate a connector, such as a USB connector, of a cable, as illustrated in FIG. 4(*b*).

The supporting leg 106 includes the depression 130, having a shape and size depending on the shape and size of the head portion 118 of the imaging unit 102. As illustrated in FIG. 4(*a*), in an example, the depression 130 may have a circular shape when the head portion 118 is cylindrical in shape, FIG. 4(*b*) illustrates the device 302 in a folded position, according to an example implementation of the present subject matter. As explained earlier, the device 302 can be folded about the hinge joint 110 into a compact structure. Further, at least a part of the head portion 118 of the imaging unit 102 is accommodated into a depression in the coupling unit 108.

The device 302 can be operationally connected to the electronic device 304 using a cable 404. When the device 302 is folded, the cable 404 can be wrapped around a part of the device 302 to prevent hanging of the cables. In an implementation, the cable 404 can be wrapped around the coupling unit 108, for example, between the second base portion 122 of the supporting leg 106 and a top surface of the coupling unit 108. Upon wrapping, a connector 406 of the cable 404, such as a USB connector, can be fit in the cleft 402 in the second base portion 122. The accommodation of the connector 406 in the cleft 402 sandwiches the connector 406 between a top surface of the coupling unit 108 and the second base portion 122. This also enables retaining the connector 406 and the cable 404 in the wrapped-around position when the device 302 is in the folded position, thereby ensuring a compact structure.

The device of the present subject matter increases the portability and maneuverability of imaging units. Since the device includes a rotatable joint between the supporting leg and the imaging unit, the imaging unit can be folded over the supporting leg. This enables the folding of the device into a highly compact structure. Further, the rotatable joint enables rotating the imaging unit about the supporting leg. This enables scanning objects from several heights and angles when the device is mounted on the electronic device, thereby enabling an efficient scanning of objects. Further, since the device can be detachably coupled to the electronic device, the device can be detached from the electronic device when not in use or when it is to be used with another electronic device.

Although implementations of the devices for scanning of objects have been described in language specific to structural features and/or methods, it is to be understood that the present subject matter is not necessarily limited to the specific features or methods described. Rather, the specific features and methods are disclosed and explained as example implementations.

We claim:

1. A device comprising:
an imaging unit to scan objects; and
a supporting unit to support the imaging unit on an electronic device, the supporting unit comprising:
a supporting leg forming a rotatable joint with the imaging unit to enable the imaging unit to fold over the supporting leg, wherein the supporting leg comprises a cleft to accommodate a connector of a cable to retain the cable when the device is in a folded position; and
a coupling unit to detachably couple the device to the electronic device.

2. The device of claim 1, wherein the supporting leg is rotatably coupled to the coupling unit.

3. The device of claim 2, comprising a ball attached to the supporting leg and a socket attached to the coupling unit, wherein the ball fits into the socket to form a rotatable coupling between the supporting leg and the coupling unit.

4. The device of claim 1, wherein to detachably couple the device to the electronic device, the coupling unit comprises a magnet to be magnetically coupled to a plate attached to the electronic device.

5. A camera assembly comprising:
an imaging unit to scan objects;
a supporting leg coupled to the imaging unit through a hinge joint, wherein the coupling between the supporting leg and the imaging unit allows folding of the imaging unit over the supporting leg; and
a coupling unit to magnetically and detachably couple the camera assembly to an electronic device, the coupling unit comprising a depression to accommodate a portion of the imaging unit when the imaging unit is folded.

6. The camera assembly of claim 5, comprising a ball and socket joint between the supporting leg and the coupling unit.

7. The camera assembly of claim 5, wherein the portion of the imaging unit to be accommodated in the depression comprises at least a part of a head portion of the imaging unit, wherein the head portion of the imaging unit comprises cameras.

8. The camera assembly of claim 7, wherein the imaging unit comprises a leg portion that is connected to the hinge joint at one end and to the head portion at another end.

9. The camera assembly of claim 8, wherein the leg portion comprises a first base portion away from the hinge joint for accommodating the head portion, wherein the first base portion has a larger width than a remainder of the leg portion to accommodate the head portion, and wherein the first base portion is at an angle lesser than 180° relative to the remainder of the leg portion.

10. The camera assembly of claim 5, wherein the supporting leg comprises a second base portion to which the coupling unit is coupled, wherein the second base portion is at an angle lesser than 180° relative to a remainder of the supporting leg.

11. The camera assembly of claim 5, wherein the imaging unit comprises at least one of a three-dimensional (3D) camera and a two-dimensional (2D) camera.

12. A device comprising:
an imaging unit to scan objects;
a supporting leg coupled to the imaging unit through a hinge joint, the hinge joint facilitating the imaging unit to rotate about the hinge joint; and
a ball attached to the supporting leg, the ball to be fitted into a socket on a coupling unit to form a ball and socket joint between the supporting leg and the coupling unit.

13. The device of claim 12, comprising the coupling unit, wherein the coupling unit comprises a face having a magnet to form a magnetic coupling with a plate attached to an electronic device and a rear side comprising the socket.

14. The device of claim 13, wherein the supporting leg comprises a second base portion to which the coupling unit is coupled, wherein the second base portion comprises a cleft on one side, and wherein the cleft comprises a step on its ends and a gap between the steps to accommodate a connector of a cable.

* * * * *